US012325480B2

(12) United States Patent
Hensolt

(10) Patent No.: US 12,325,480 B2
(45) Date of Patent: Jun. 10, 2025

(54) BICYCLE FRAME ELEMENT

(71) Applicant: Canyon Bicycles GmbH, Koblenz (DE)

(72) Inventor: Matthias Hensolt, Koblenz (DE)

(73) Assignee: Canyon Bicycles GmbH, Koblenz (DE)

(*) Notice: Subject to any disclaimer, the term of this patent is extended or adjusted under 35 U.S.C. 154(b) by 287 days.

(21) Appl. No.: 17/896,118

(22) Filed: Aug. 26, 2022

(65) Prior Publication Data
US 2023/0065830 A1 Mar. 2, 2023

(30) Foreign Application Priority Data

Aug. 27, 2021 (DE) .......................... 202021104617.1

(51) Int. Cl.
B62J 11/19 (2020.01)
B62J 11/13 (2020.01)
B62J 11/16 (2020.01)
B62J 43/13 (2020.01)
B62J 43/28 (2020.01)
B62K 11/02 (2006.01)

(52) U.S. Cl.
CPC ............... *B62J 43/28* (2020.02); *B62J 11/13* (2020.02); *B62J 11/16* (2020.02); *B62J 11/19* (2020.02); *B62J 43/13* (2020.02); *B62K 11/02* (2013.01)

(58) Field of Classification Search
CPC ........ B62K 19/30; B62K 11/02; B62K 19/02; B62K 3/02; B62K 19/06; B62M 6/90; B62J 43/28; B62J 11/19; B62J 11/13; B62J 11/16; B62J 43/13

USPC ....................................................... 180/68.5
See application file for complete search history.

(56) References Cited

U.S. PATENT DOCUMENTS

| | | | | |
|---|---|---|---|---|
| 8,727,367 B2* | 5/2014 | Talavasek | .............. | B62K 19/06 |
| | | | | 280/281.1 |
| 8,979,110 B2* | 3/2015 | Talavasek | ................ | B62M 6/60 |
| | | | | 280/279 |
| 9,580,140 B2* | 2/2017 | Talavasek | ................ | B62M 6/60 |
| 9,738,347 B2* | 8/2017 | Talavasek | .............. | B62K 11/14 |
| 9,950,602 B2* | 4/2018 | Duan | ..................... | B62K 19/30 |
| 11,211,663 B2* | 12/2021 | Yoneda | .................. | B62K 19/30 |
| 11,572,132 B2* | 2/2023 | den Hertog | ........... | H01M 50/20 |
| 2013/0241169 A1* | 9/2013 | Talavasek | .............. | B62K 19/30 |
| | | | | 280/274 |
| 2013/0241170 A1* | 9/2013 | Talavasek | ................ | B62M 6/90 |
| | | | | 429/97 |

(Continued)

FOREIGN PATENT DOCUMENTS

| | | |
|---|---|---|
| CN | 208698987 U | 4/2019 |
| DE | 102013204557 A1 | 9/2013 |

(Continued)

*Primary Examiner* — James A Shriver, II
*Assistant Examiner* — Hilary L Johns
(74) *Attorney, Agent, or Firm* — The Webb Law Firm

(57) ABSTRACT

A bicycle frame element includes a frame tube, such as a downtube. The same forms an accommodation space for accommodating a battery. Further, a channel element is arranged in particular in the frame tube, which extends in the longitudinal direction of the frame tube, and serves to accommodate cables, wires, hydraulic lines and the like. To simplify the mounting, the channel element can be closed with a cover element. The cover element is held so as to be slidable in particular in the longitudinal direction.

15 Claims, 2 Drawing Sheets

(56) References Cited

U.S. PATENT DOCUMENTS

| | | | | |
|---|---|---|---|---|
| 2014/0175768 A1* | 6/2014 | Talavasek | ............... | B62J 43/13 |
| | | | | 280/279 |
| 2015/0183489 A1* | 7/2015 | Talavasek | .............. | B62K 19/40 |
| | | | | 180/207.3 |
| 2017/0001677 A1* | 1/2017 | Adomeit | .................. | B62J 11/19 |
| 2017/0144729 A1* | 5/2017 | Talavasek | ............... | B62M 6/90 |
| 2017/0190243 A1* | 7/2017 | Duan | ....................... | B62M 6/90 |
| 2018/0269439 A1* | 9/2018 | Yoneda | .................... | B62M 6/90 |
| 2019/0039687 A1* | 2/2019 | Lay | ........................ | B62M 6/55 |
| 2019/0135369 A1* | 5/2019 | Thoma | .................. | B62K 19/40 |

FOREIGN PATENT DOCUMENTS

| | | |
|---|---|---|
| DE | 102013108313 A1 | 7/2014 |
| JP | 2019202611 A | 11/2019 |
| NL | 2021658 | 5/2020 |

* cited by examiner

BICYCLE FRAME ELEMENT

CROSS-REFERENCE TO RELATED APPLICATION

This application claims priority to German Patent Application No. 20 2021 104 617.1 filed Aug. 27, 2021, the disclosure of which is hereby incorporated by reference in its entirety.

BACKGROUND OF THE DISCLOSURE

Field of the Disclosure

The disclosure relates to a bicycle frame element.

Description of Related Art

For bicycles with an electric drive, it is known to arrange the battery in a frame element, in particular the downtube of the bicycle frame. In particular, such bicycle frames are designed such that the downtube is open at its lower side located in the region of the bottom bracken shell, so that the battery can be inserted into the bicycle frame from below. However, cables such as Bowden cables for the gearing system, hydraulic lines for brakes, wires and the like are often arranged within the downtube. For arranging such cables and the like, it is known to provide closed tubes in the downtube of the bicycle frame, which tubes are in particular laminated into a carbon frame. The corresponding lines, cables etc. can be pushed through these closed tubular cable channels. However, the provided space may possibly be insufficient as the range of functions of bicycles increases. As such, it is necessary to provide further wires and the like e.g. for light, ABS and the like. A further problem is that the wires may have large connectors e.g. to be connected with the battery. Here, the contact with the battery is often made in the upper region of the downtube, so that the contact is made when the battery is inserted into the downtube from below. However, wires with relatively large connectors cannot be passed through the known tubular cable channels.

SUMMARY OF THE DISCLOSURE

It is an object of the disclosure to provide a bicycle frame element which enables a simple and reliable arrangement and mounting of cables, wires and the like.

According to the disclosure, the object is achieved by a bicycle frame element having the features as described herein.

The bicycle frame element according to the disclosure, comprises a frame tube which in particular is a downtube of a bicycle frame. The frame tube forms an accommodation space for a battery. In addition, a channel element is provided which extends in the longitudinal direction of the accommodation space and thus extends in particular in the longitudinal direction of a battery inserted into the accommodation space. The channel element serves to accommodate cables, such as Bowden cables, hydraulic lines, wires and the like. In order to enable a simple mounting of the cables and the like in the channel element, the channel element has a cover element for closing the channel element. This has the advantage that first, the cables, wires, hydraulic lines and the like can be mounted with the channel element opened, and thereafter, the cover element is closed again, so that a channel closed in itself is formed when the cover element is closed. In this manner, it is avoided that shift cables, wires and the like are damaged upon insertion and removal of the battery into and from the frame tube. On the other hand, a facilitated mounting is realized by providing a cover element.

The channel element is preferably arranged inside the frame tube and extends in the longitudinal direction of the frame tube. With a battery inserted into the frame tube, the longitudinal direction of the frame corresponds to the longitudinal direction of the battery. It is preferred that the channel element extends inside the frame tube for a length that substantially corresponds to the length of the battery. It is thus ensured that a damaging of cables, wires and the like upon inserting or removing the battery is avoided. It is possible that the channel element can also have a length that is greater that the length of the battery.

In a preferred embodiment of the disclosure, a holding element is provided for the cover. The same may be a separate component. It is preferred that the holding element is provided on the cover element and/or on the channel element. Here, the holding element may comprise, for example, latching elements, bracket-shaped holding elements or the like.

In a particularly preferred embodiment, the holding element comprises a groove. The same is preferably arranged on the channel element, so that the cover element can be inserted into the groove in the longitudinal direction to close the channel element. Thereby, it is possible to close the channel element in a simple manner.

The groove may also be provided on the cover element. Here, to form the groove, the cover comprises, for example, a protrusion with a C-shaped cross section extending in the longitudinal direction. The same engages around a protrusion on the channel element, so that the cover element can again be inserted or slid thereon to close the channel element. Of course, combinations of these embodiments are also possible, wherein, for example, on one side of the cover element, the groove is provided in the channel element and, on the other side of the cover element, the groove is formed by the cover element itself. The grooves extend in particular in the longitudinal direction of the channel element. Here, inserting or removing the cover element is performed in particular also in the longitudinal direction.

In a preferred embodiment of the disclosure, the channel element comprises at least two chambers extending in particular in the longitudinal direction. Here, it is preferred that each chamber can be closed with a separate cover element. Thereby, mounting and also repair are further facilitated.

Preferably, the chambers are formed by being separated from each other by a web extending in particular in the longitudinal direction. Thereby, the web may be designed such in a preferred embodiment that a part of the holding element is formed by the web or is connected with the web. Since, in the preferred embodiment, the web separates two chambers from each other, it is further preferred that the web comprises or forms two holding elements. These are arranged opposite each other so that a corresponding holding element is provided per chamber. Inserting and removing the cover elements is effected, per chamber, as described above, in a preferred embodiment and by providing corresponding grooves.

Preferably, the channel element has a rear wall extending in the longitudinal direction, the outer side of which preferably having a contour that substantially corresponds to the contour of an inner side of the frame tube. This has the advantage that the channel element is in surface contact with the inner side of the frame tube and thus can be connected with the frame element in a simple manner by gluing. Instead of gluing, it is also possible to bolt the cable channel. To this end, holes are provided in the corresponding frame tube, through which it is possible to fix the cable channel using bolts. However, this is disadvantageous in that bolt heads are visible. A preferred fastening of the cable channel is achieved by welding. This is possible with frame tubes of a plastic material, such as carbon or the like. For this purpose, holes are drilled into the frame tube. Thereafter, the cable channel is welded via these holes, which are then closed with welding beads and ground. Such a fastening is no longer visible after painting the frame tube.

For a channel element with a plurality of chambers it is preferred that the web is arranged on an inner side of the rear wall and is formed integrally in particular with the rear wall. It is particularly preferred that, regardless of the number of the chambers, the channel element is a profile element, the profile of which does not change in the longitudinal direction. In particular, such a channel element can be manufactured by extrusion. The channel element is preferably made of plastic material, aluminum or the like. Manufacturing the channel element as an extruded profile further has the advantage that the same can be shortened in a simple manner, so that an adjustment to the length of the frame element, the battery used etc. is possible in a simple manner.

The cover elements may in particular also be elements configured as profiles, the cross section of which also does not change in the longitudinal direction. The cover elements can be made from a more flexible material to enable a simple insertion into or withdrawal from the holding elements. Preferably, the cover element is made of a plastic material.

In a further preferred embodiment, the web is provided with at least one threaded bore. In the mounted state of the channel element, the threaded bores are arranged such that they align with passage bores in the frame tube. In combination with the threads, the passage bores can serve, for example, to fix the channel element from outside using bolts. Similarly, the threaded bores can be used to fasten components such as a bottle holder or the like on the frame tube.

BRIEF DESCRIPTION OF THE DRAWINGS

In the following, the disclosure is described in more detail by means of a preferred embodiment with reference to the accompanying drawings.

In the drawings.

DETAILED DESCRIPTION

Figure 1:
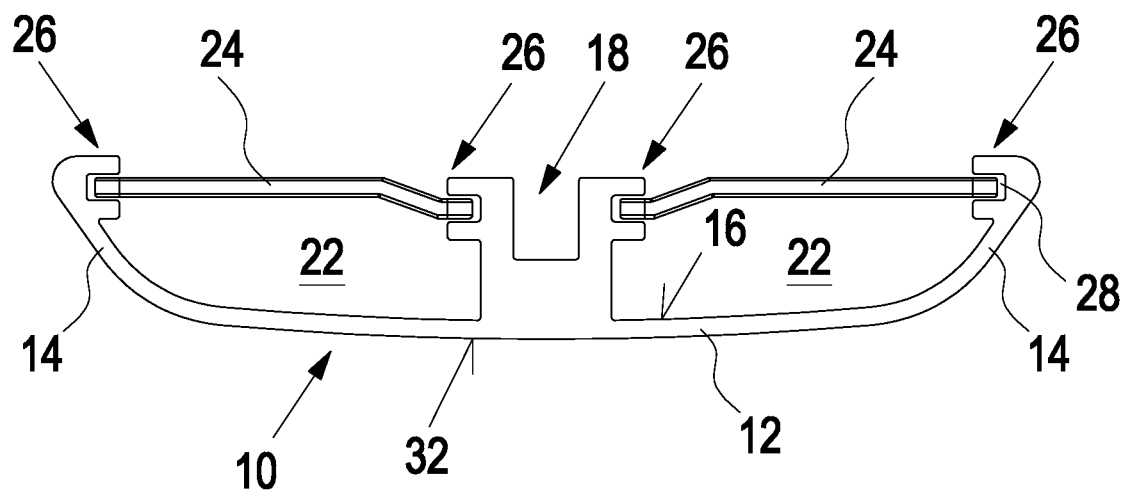
FIG. 1 is a schematic sectional view of a channel element with a cover element.
Figure 2:
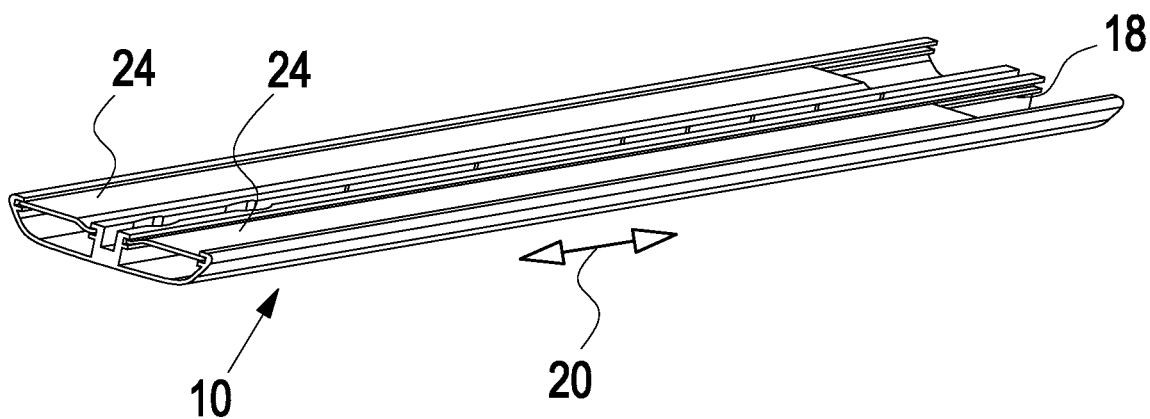
FIG. 2 is a schematic perspective view of the channel element with a cover element illustrated in FIG. 1

The channel element 10 manufactured in particular as an extruded profile has a rear wall 12 passing into two side walls 14 extending parallel to each other. On an inner side 16 of the rear wall 12, a web 18 is formed which also extends completely in the longitudinal direction 20.

In the embodiment illustrated, two chambers 22 are formed. The two chambers 22 can each be closed with a cover element 24, the cover element 24 being slidable in the longitudinal direction 20.

Holding elements 26 are provided to hold the cover elements 24. Each of these comprises a groove 28 extending in the longitudinal direction 20. One respective cover element can be inserted into or withdrawn from the grooves 28 in the longitudinal direction 20.

Figure 3:
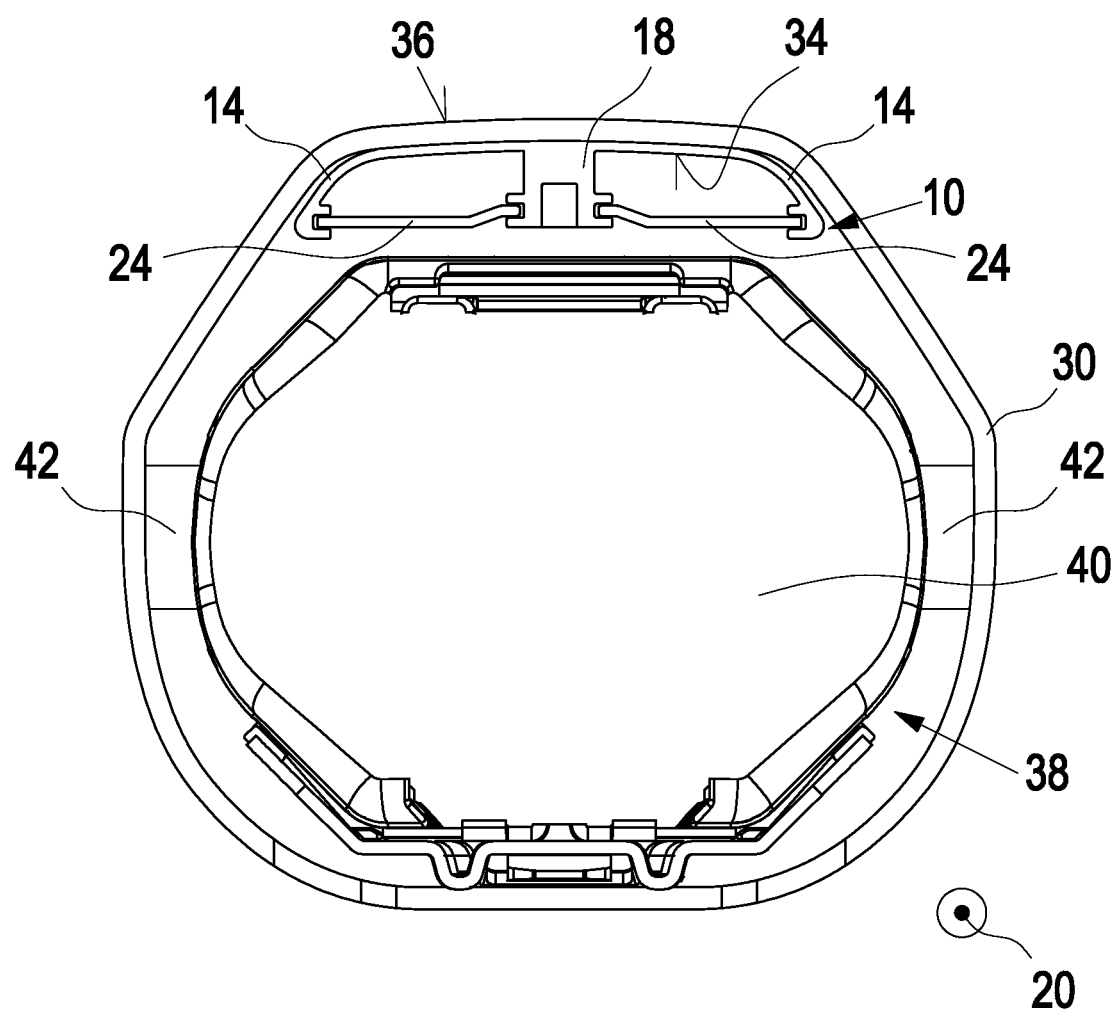
FIG. 3 is a schematic sectional view of a frame tube with a channel element with a cover element and a battery arranged therein.

In the mounted state (FIG. 3), the channel element 10 is arranged inside a frame tube, such as a downtube 30. For this purpose, the contour of an outer side 32 (FIG. 1) of the channel element 10 is formed substantially such that is correspond to the contour of an inner side 34 of the frame tube. The outer side 32 of the channel element 10 thus is in contact with the inner side 34 of the frame profile 30, as can be seen in FIG. 3. Here, the side walls 14 of the channel element 10 may possibly have a shorter distance from the inner side 34 of the frame tube 30.

In the web 18, threaded bores (not illustrated) can be provided which extend perpendicular to the inner side 34 of the frame tube 30. Passage bores in the frame tube 30, which are not illustrated either, are aligned with these. The latter serve in particular to fix a bottle holder to an outer side 36 of the frame tube by means of bolts.

Further, the frame tube 30 forms an accommodation space 38 that extends in the longitudinal direction, i.e. perpendicular to the drawing plane of FIG. 3. A battery 40 is arranged inside the accommodation space, the position of the battery 40 and the accommodation space 38 is possibly defined by spacers 42.

In particular before inserting the battery 40 into the accommodation space 38, the cover elements 24 can be withdrawn in a simple manner. Lines, cables, wires etc. can easily be mounted in the then open channels 22. After the mounting or the repair is completed, the channels 22 can be closed again in a simple manner by inserting the cover elements 24. Thereby, the wire lines, cables etc. arranged in the channels 22 are protected from damage when the battery 40 is inserted or withdrawn.

The invention claimed is:

1. A bicycle frame element comprising
an accommodation space for a battery, provided in a frame tube of a bicycle frame, and
a channel element for cables, wires, hydraulic lines, etc. that extends in a longitudinal direction of the accommodation space,
wherein the channel element comprises at least two chambers extending in the longitudinal direction,
wherein the chambers are separated by a web,
wherein the web has at least one threaded bore which, in the mounted state, aligns with passage bores in the frame tube, and
wherein a cover element for closing the channel element is provided.

2. The bicycle frame element according to claim 1, wherein the channel element is arranged in the frame tube.

3. The bicycle frame element according to claim 1, wherein a holding element for the cover element is provided, extending in the longitudinal direction of the channel element.

4. The bicycle frame element according to claim 3, wherein the holding element is provided at the cover element and/or at the channel element.

5. The bicycle frame element according to claim 3, wherein the holding element is formed as a groove arranged at the channel element, into which groove the cover element can be inserted in the longitudinal direction.

6. The bicycle frame element according to claim 3, wherein the holding element is formed as a groove arranged at the cover element, said groove cooperating with a protrusion of the channel element extending in the longitudinal direction.

7. The bicycle frame element according to claim 1, wherein the web extends in the longitudinal direction.

8. The bicycle frame element according to claim 1, wherein the web forms a part of the holding element.

9. The bicycle frame element according to claim 1, wherein the channel element has a rear wall extending in the longitudinal direction.

10. The bicycle frame element according to claim 9, wherein the web is arranged on an inner side of the rear wall of the channel element.

11. The bicycle frame element according to claim 1, wherein the frame tube is a downtube of the bicycle frame.

12. The bicycle frame element according to claim 2, wherein the channel element extends in the longitudinal direction of the frame tube.

13. The bicycle frame element according to claim 8, wherein the web comprises two holding elements.

14. The bicycle frame element according to claim 9, wherein an outer side of the rear wall of the channel element comprises a contour that substantially corresponds to a contour of an inner side of the frame tube.

15. The bicycle frame element according to claim 10, wherein the web is formed integrally with the rear wall of the channel element.

\* \* \* \* \*